United States Patent
Collins, III (10) Patent No.: US 11,176,338 B1
(45) Date of Patent: Nov. 16, 2021

(54) ON-CHIP RF INTERROGATION FOR HETEROGENEOUS RFIDS

(71) Applicant: BAE SYSTEMS Information and Electronic Systems Integration Inc., Nashua, NH (US)

(72) Inventor: Thomas E. Collins, III, Tyngsboro, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 45 days.

(21) Appl. No.: 16/671,511

(22) Filed: Nov. 1, 2019

(51) Int. Cl.
*G06K 7/10* (2006.01)
*G06Q 10/08* (2012.01)

(52) U.S. Cl.
CPC ..... *G06K 7/10386* (2013.01); *G06K 7/10316* (2013.01); *G06Q 10/087* (2013.01)

(58) Field of Classification Search
CPC ........... G06K 7/10386; G06K 7/10316; G06Q 10/087
USPC ................................ 340/10.1–10.5; 235/370
See application file for complete search history.

(56) References Cited

U.S. PATENT DOCUMENTS

| | | | | |
|---|---|---|---|---|
| 6,480,110 B2 * | 11/2002 | Lee | ..................... | G06K 19/0672 340/572.5 |
| 6,718,163 B2 * | 4/2004 | Tandy | ..................... | H01L 23/48 257/725 |
| 8,237,622 B2 * | 8/2012 | Furumura | ............... | H01Q 21/29 343/895 |
| 8,279,048 B2 * | 10/2012 | Gravelle | ............ | G06K 19/0716 340/10.42 |
| 8,412,290 B2 * | 4/2013 | Shamim | .................. | G01T 1/026 455/575.7 |
| 8,579,195 B2 * | 11/2013 | Tiggelman | .............. | H01L 23/66 235/439 |
| 8,917,210 B2 * | 12/2014 | Dang | .................... | H01Q 1/2283 343/700 MS |
| 9,112,263 B2 * | 8/2015 | Pagani | ............. | G06K 19/07779 |
| 9,489,606 B1 * | 11/2016 | Korhummel | ........ | G06K 19/0704 |
| 9,639,797 B2 * | 5/2017 | Cardullo | .......... | G06K 19/07786 |
| 9,684,862 B2 * | 6/2017 | Andry | ................ | G06K 19/0775 |
| 9,916,744 B2 * | 3/2018 | Busby | ................... | G08B 13/128 |
| 10,083,391 B2 * | 9/2018 | Costantino | ....... | G06K 19/07722 |
| 10,193,211 B2 * | 1/2019 | Finn | ........................ | H01Q 1/38 |
| 2008/0135615 A1 * | 6/2008 | Moran | ............. | G06K 19/07779 235/439 |
| 2011/0036912 A1 * | 2/2011 | Guo | ................. | G06K 19/07779 235/492 |

(Continued)

OTHER PUBLICATIONS

Chen et al; A 2.45-GHz Near-Field RFID System With Passive On-Chip Antenna Tags, IEEE Transactions on Microwave Theory and Technoques, vol. 56, No. 6, Jun. 2008, pp. 1397-1404.

(Continued)

*Primary Examiner* — Nam V Nguyen
(74) *Attorney, Agent, or Firm* — Maine Cernota & Rardin; Scott J. Asmus (57) ABSTRACT

Techniques and architecture are disclosed for allowing the provenance of an integrated circuit to be verified using a dielet in wireless communication with a die through a near-field communications protocol where the positions of the dielet and die are fixed relative to one another during manufacturing such that their respective means for wirelessly communicating with one another are aligned.

19 Claims, 7 Drawing Sheets

(56) References Cited

U.S. PATENT DOCUMENTS

2013/0285477 A1* 10/2013 Lo .......................... B81B 7/02
307/151
2018/0331579 A1* 11/2018 Gong ..................... H02J 50/80

OTHER PUBLICATIONS

Usami: Mitsuo, An Ultra-Small RFID Chip: μ-chip, 2004 IEEE Asia-Pacific Conference on Advanced System Integrated Circuits (AP-ASIC2004)/Aug. 4-5, 2004, 4 pages.
Leef; Serge, Supply Chain Hardware Integrity for Electronics Defense (SHIELD), accessed Oct. 23, 2019, https://www.darpa.mil/program/supply-chain-hardware-integrity-for-electronics-defense.

* cited by examiner

ON-CHIP RF INTERROGATION FOR HETEROGENEOUS RFIDS

FIELD OF THE DISCLOSURE

This disclosure relates to provenance verification of Integrated Circuits (ICs). More specifically, this disclosure pertains to provenance verification of ICs by a user through wired communications that utilize wireless, near-field communications, in embodiments Radio Frequency Identification (RFID), to interrogate a die and confirm its provenance.

BACKGROUND

The security and integrity of electronic systems is challenged by the presence of counterfeit integrated circuits (ICs) in the supply chain. Counterfeiters use a variety of easy and inexpensive techniques to recycle discarded ICs, alter them, and reintroduce them to the supply chain for profit. These parts have questionable reliability and may not function as specified. The failure of a fielded system due to the presence of a counterfeit IC can jeopardize the success of a mission and put lives at risk when the ICs are used in military operations.

Currently, efforts are underway to eliminate counterfeit integrated circuits from the electronics supply chain by making counterfeiting too complex and time-consuming to be cost effective. These efforts include the use of NSA-level encryption, sensors, near-field power, and communications into a microscopic-scale chip capable of being inserted into the packaging of an integrated circuit. This microscopic-scale chip is referred to as a "dielet" and acts as a hardware root of trust, detecting any attempt to access or reverse engineer the dielet.

Authentication of the IC is achieved through the use of a wireless, external probe that can wirelessly provide power to the dielet and establish a secure link between the dielet and a server, allowing the provenance of the IC to be verified. In this case, the interrogating antenna is not part of the package or the die, and is a separate piece of equipment designed for this purpose (i.e. the external probe). While this configuration allows the provenance of the IC to be verified, it has many drawbacks. Notably, the required interrogation power is relatively high and alignment of the external probe to the dielet, which is typically performed by hand, can be difficult.

Another proposed solution to this problem involves the use of a physical unclonable function (sometimes also called physically unclonable function), or PUF, which serves as a physically-defined "digital fingerprint" that provides a unique identity for a semiconductor device, such as a microprocessor. A PUF is a physical entity embodied in a physical structure. More specifically, PUFs result from the unique physical variations that occur naturally during semiconductor manufacturing.

While beneficial, PUFs also have substantial drawbacks that prevent their widespread adoption. For instance, fabrication processes must be modified to provide PUFs and this must be done for each process used to create dies. These are one-time, or Non-recurring Engineering (NRE) costs, but can be substantial, especially where many different processes are used.

What is needed, therefore, are cost effective apparatuses, systems, and methods to verify the provenance of ICs that do not rely on the precise alignment of external probes and have relatively low power requirements.

SUMMARY

By mounting relatively small RFID tags directly on dies, many of the problems associated with the prior art can be avoided. More specifically, by designing a small loop antenna into the top-metal of an IC that aligns with a corresponding loop antenna in a dielet mounted thereon, a near-field RF link with a fixed separation distance between loop antennas on the order of ~20 μm is achievable, dramatically lowering power requirements while avoiding issues with alignment by allowing the user to "talk" to the die through normal wired communication, while the die talks to the dielet through the coupled loop antennas.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The power characteristics and requirement of prior art devices reliant on an external probe, which may also be referred to generally as an interrogator, to communicate with a dielet 500 are described in FIGS. 1-4. Notably, such dielets 500 typically rely on very small (e.g. ~100 μm) loop antennas 600/602 to allow them to receive power through coupling of magnetic fields from a wireless, external probe. The minimum turn-on voltage for a typical dielet 500 is ~170 mv. The small size of the loop antennas 600/602 makes coupling sufficient magnetic field into the dielet's 500 loop antenna 602 to allow the dielet 500 to function a significant challenge.

Figure 1:
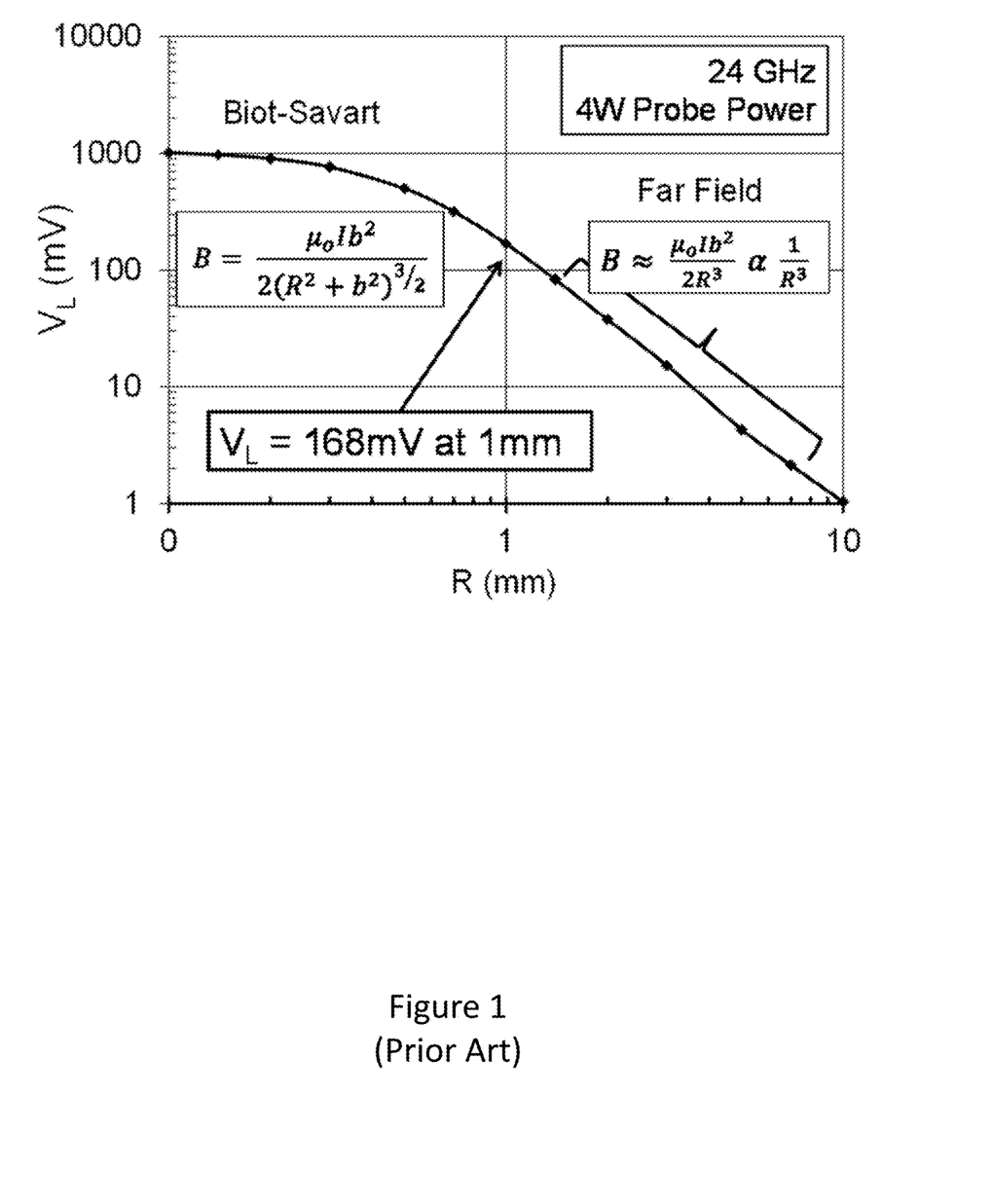
FIG. 1 is a graph describing the relationship between voltage and separation distance for prior art devices that make use of a wireless, external probe to enable communications with a dielet.
Figure 2:
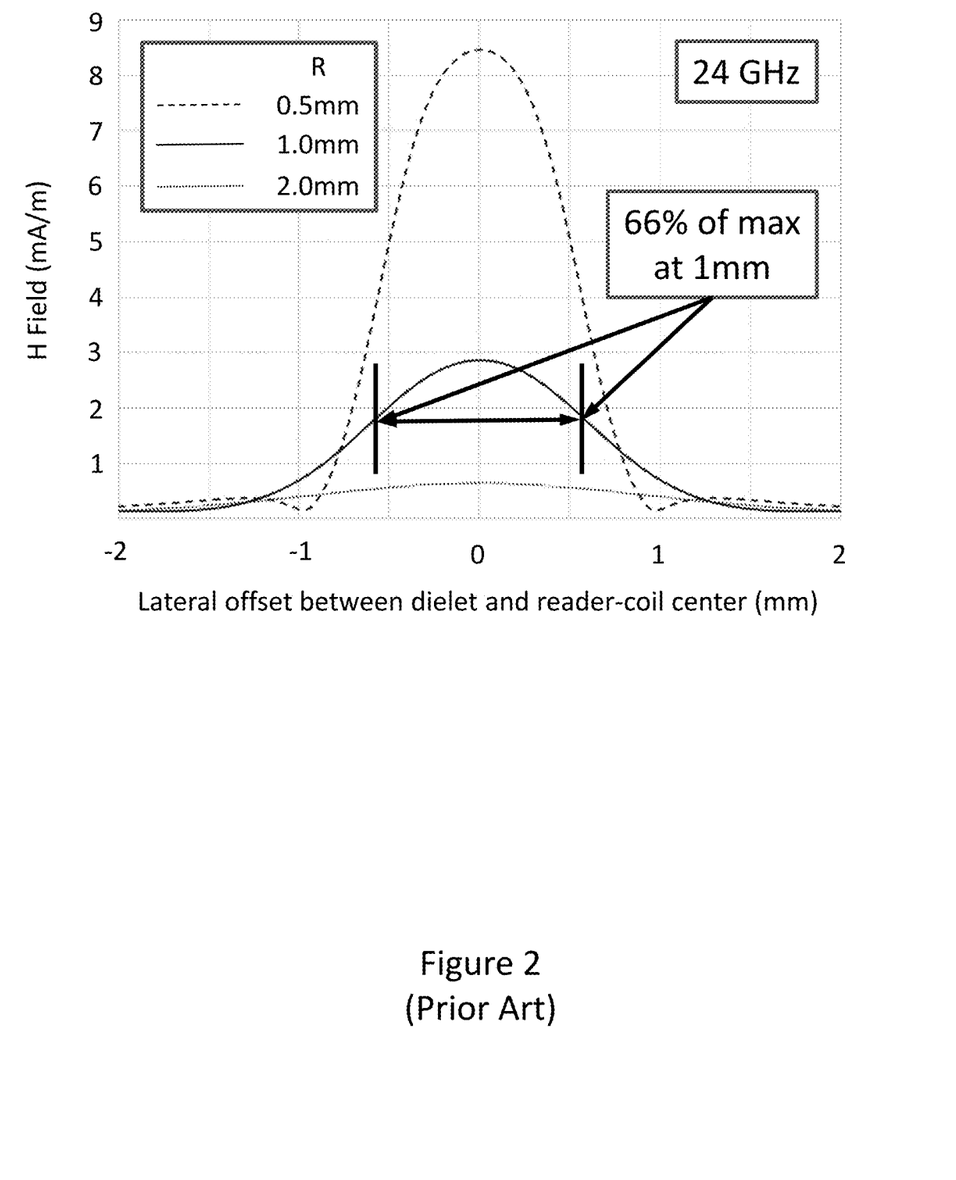
FIG. 2 is a graph describing the relationship between the magnetic field strength and lateral offset between a dielet and wireless, external probe (i.e. a reader coil) for prior art devices that make use of an external probe to enable communications with a dielet.
Figure 3:
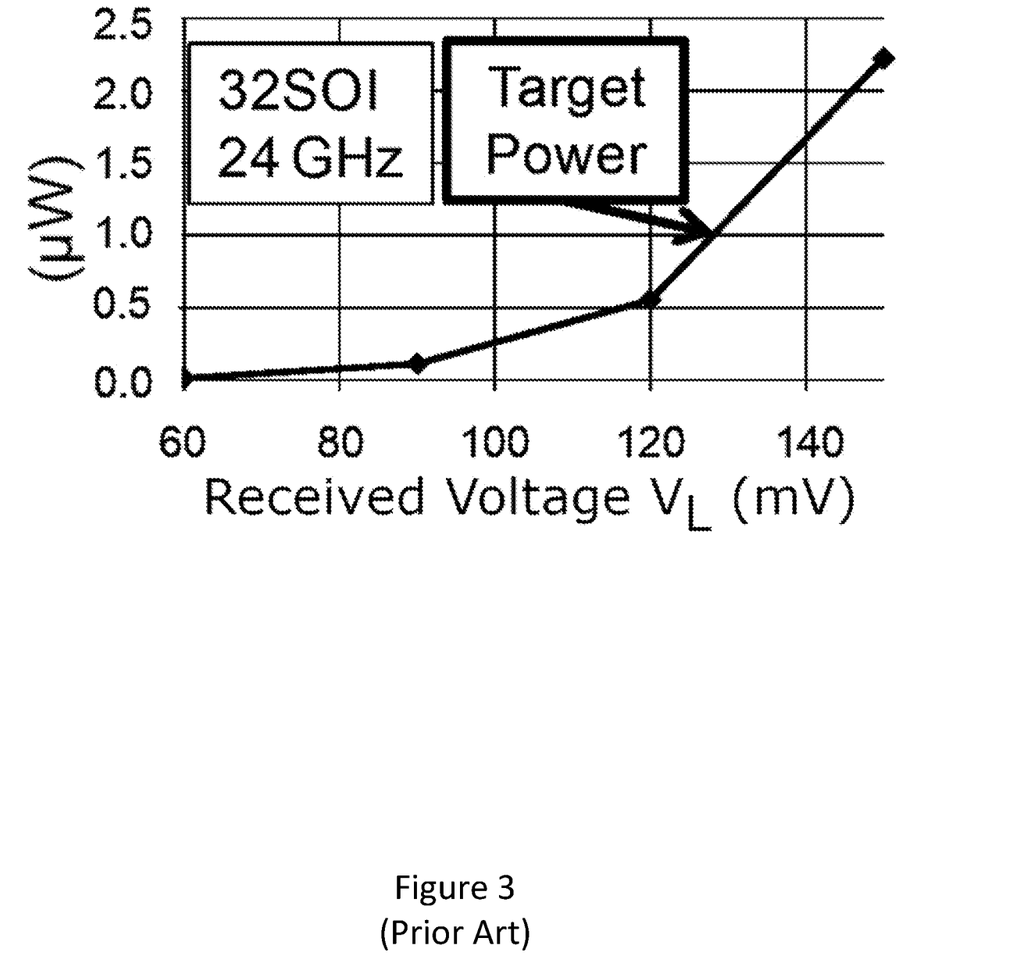
FIG. 3 is a graph describing the relationship between power and voltage received by a dielet for prior art devices that make use of a wireless, external probe to enable communications with a dielet.
Figure 4:
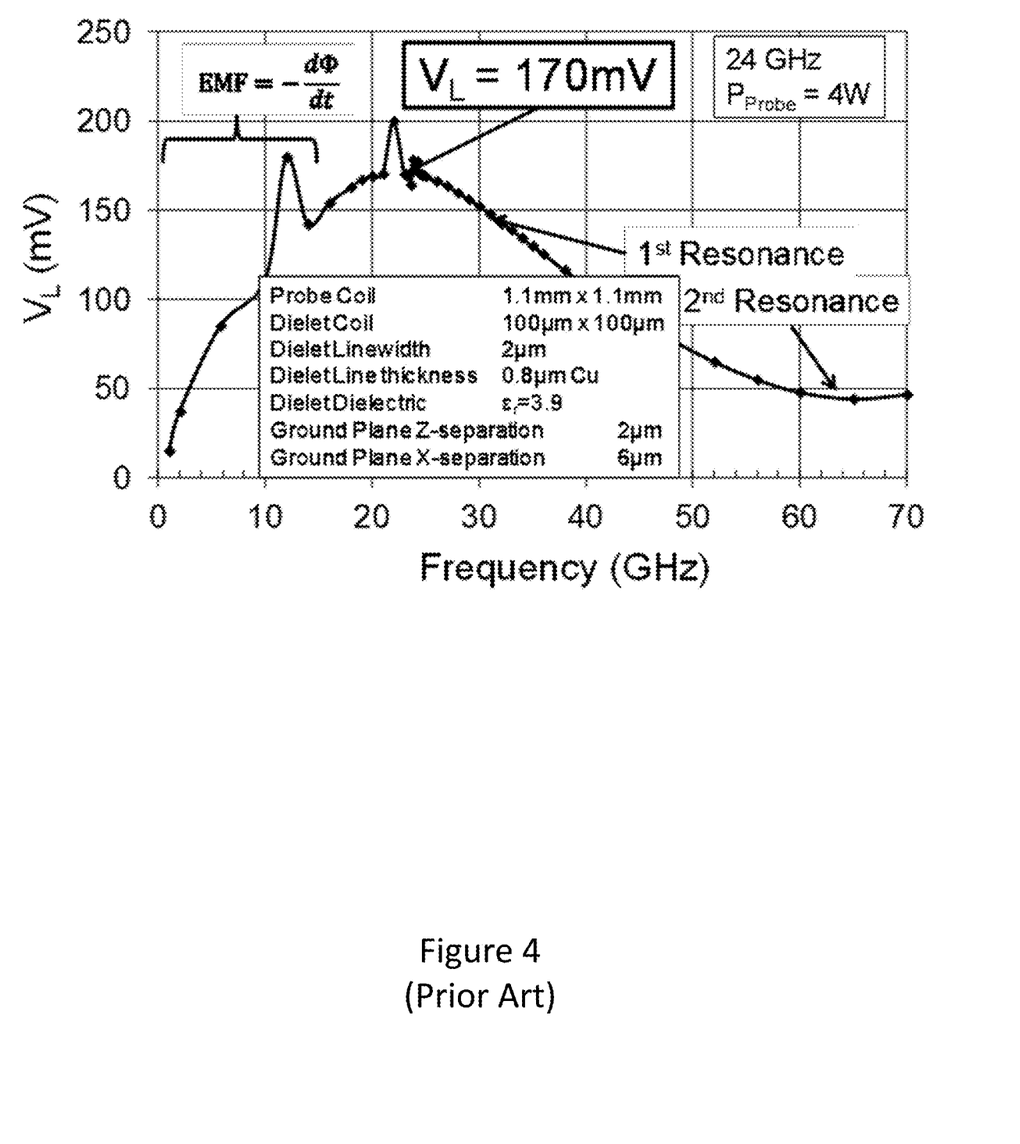
FIG. 4 is a graph describing the relationship between voltage received by a dielet and frequency for prior art devices that make use of a wireless, external probe to enable communications with a dielet.

For instance, as can be seen in FIG. 1, assuming a frequency of 24 GHz, which is a typical value in this space, and a separation distance of only 1 mm, which is very short, a wireless, external probe power of at least 4 W is required to induce sufficient voltage (i.e. >~170 mv) in the dielet 500 to allow it to turn on and provide the ~1 μW of power necessary to sustain a typical dielet's 500 operation (i.e. the target power), as graphically described in FIG. 2. A chart describing the relationship between voltage and frequency is also provided in FIG. 3.

While the separation distance, size, and power requirements present significant challenges, the ability of a user to precisely align the wireless, external probe to the dielet 500 also results in significant additional power being required to allow sufficient magnetic field to be coupled into the dielet's 500 loop antenna 602 to allow the dielet to function. This is graphically described in FIG. 4, which compares the magnetic field strength to the lateral offset between the wireless external probe and dielet 500. As can be seen in this figure, to couple at least 66% of the external probe's magnetic field with the dielet 500, the external probe's antenna must be within +/−0.6 mm of perfect alignment relative to the dielet 500. In practice, this is quite difficult.

Figure 5:
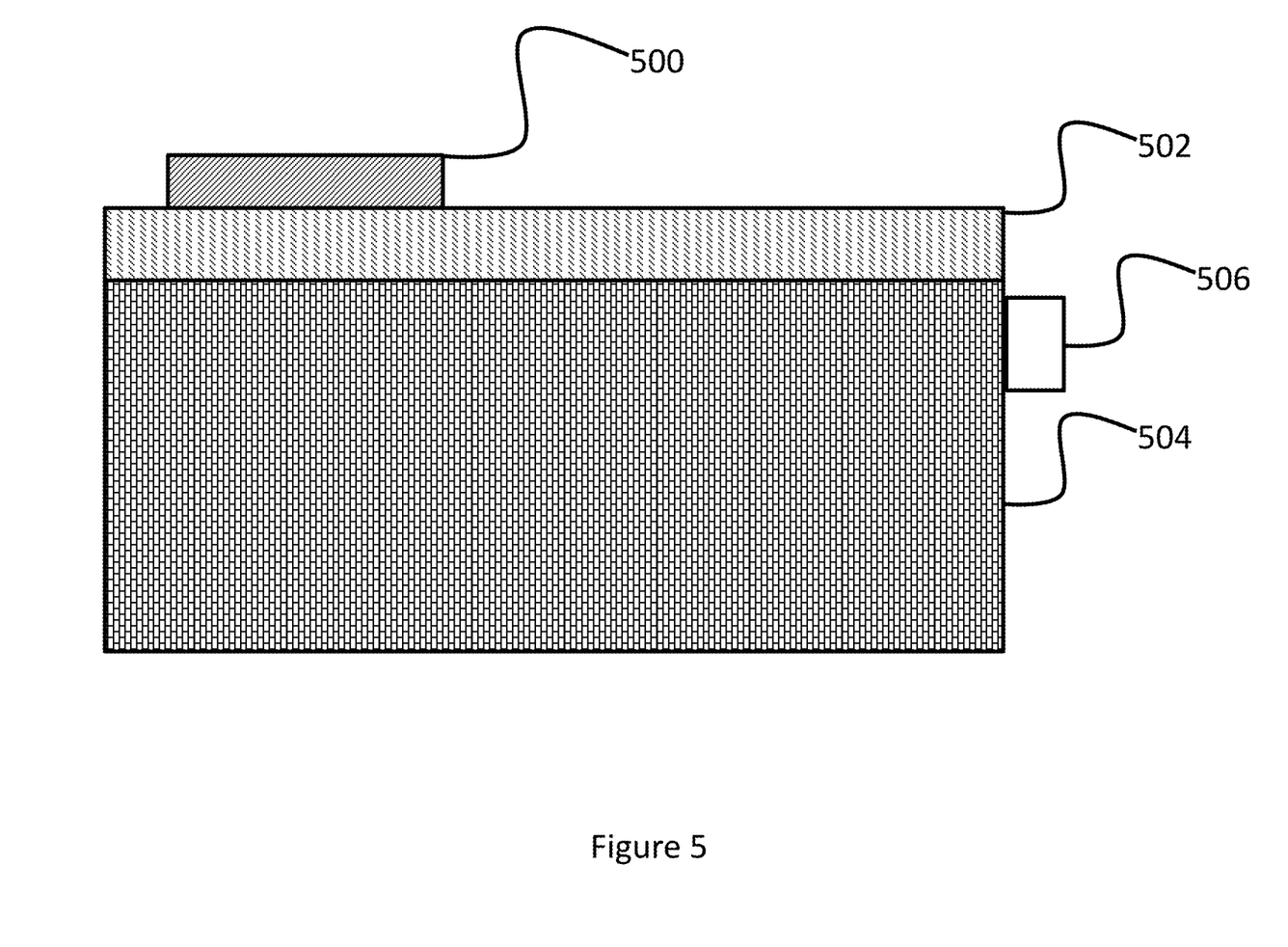
FIG. 5 is side elevation view of a die and dielet, in accordance with embodiments of the present disclosure.
Figure 6:
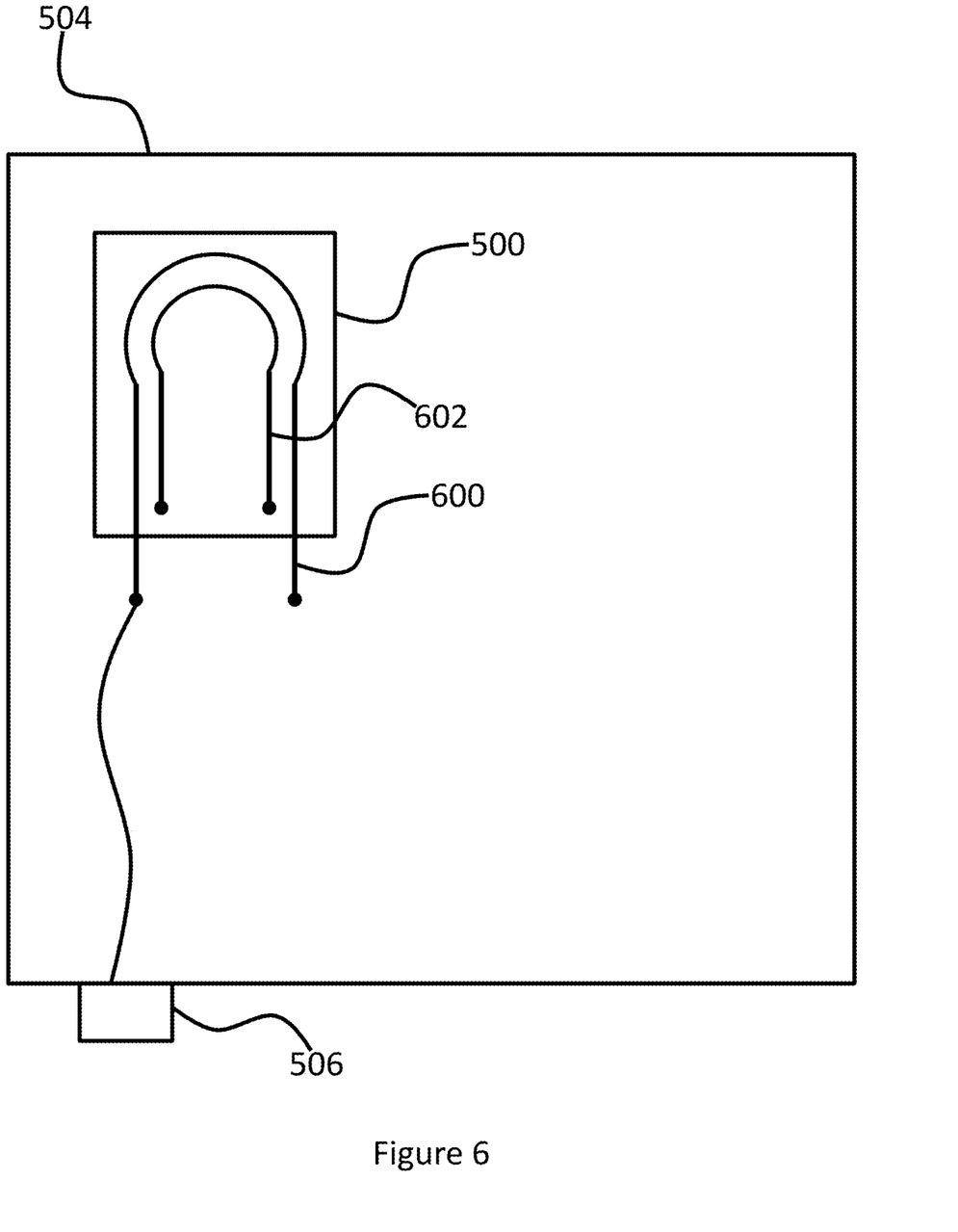
FIG. 6 is a top view of a die and dielet with corresponding loop antennas, in accordance with embodiments, of the present disclosure.

Unlike provenance verification techniques that rely on a wireless, external probe to provide sufficient current to a small die, or dielet 500, embodiments of the present disclosure require no wireless, external probe and therefore do not suffer from the alignment and power transfer issues inherent to such technologies. More specifically, by permanently aligning an antenna 600 in a die 504 on which the dielet 500 is mounted with a corresponding antenna 602 in a dielet 500 (i.e. by placing the interrogator within the die and fixing its position relative to the dielet 500 during manufacturing), maximum coupling can be achieved repeatably and without difficulty, drastically reducing power requirements while maximizing productivity. Such a configuration is shown in FIGS. 5 and 6. A wired, external probe 710 is then connected to the antenna 600 through a communications port 506 affixed to the die 504, thereby enabling communication with the dielet 500 over the wireless link created between the antennas 600/602.

Specifically referring to FIG. 5, a dielet 500 is mounted to a die 504 having an external, wired communications port 506. In embodiments, the dielet 500 is fixed to glass 502 that is also fixed to a die 504 on a side opposite the dielet 500. In embodiments, the glass 502 between the dielet 500 and die 504 is 5 μm thick.

FIG. 6 shows a top view of the die 504 and dielet 500 of FIG. 5 in which antennas 600/602 are depicted within both components, with the die's antenna connected to an externally-accessible communications port 506, the communications port 506 being in electrical communication with the die's antenna 600. In embodiments, the communications port 506 is a Radio Frequency (RF) connector. In embodiments, these antennas 600/602 are loop antennas.

Placing an antenna 600 (i.e. an interrogator) within the die 504 itself, in addition to the dielet 500, allows the separation distance between the dielet antenna 602 and the interrogator 600 to be fixed and substantially reduced, in embodiments to within 15 μm, drastically reducing interrogator 604 power requirements. This configuration enables a user to communicate with the dielet 500 through wired communications with the interrogator 604, which then communicates with the dielet 500 through its antenna 602, simplifying the process while making it more robust.

Figure 7:
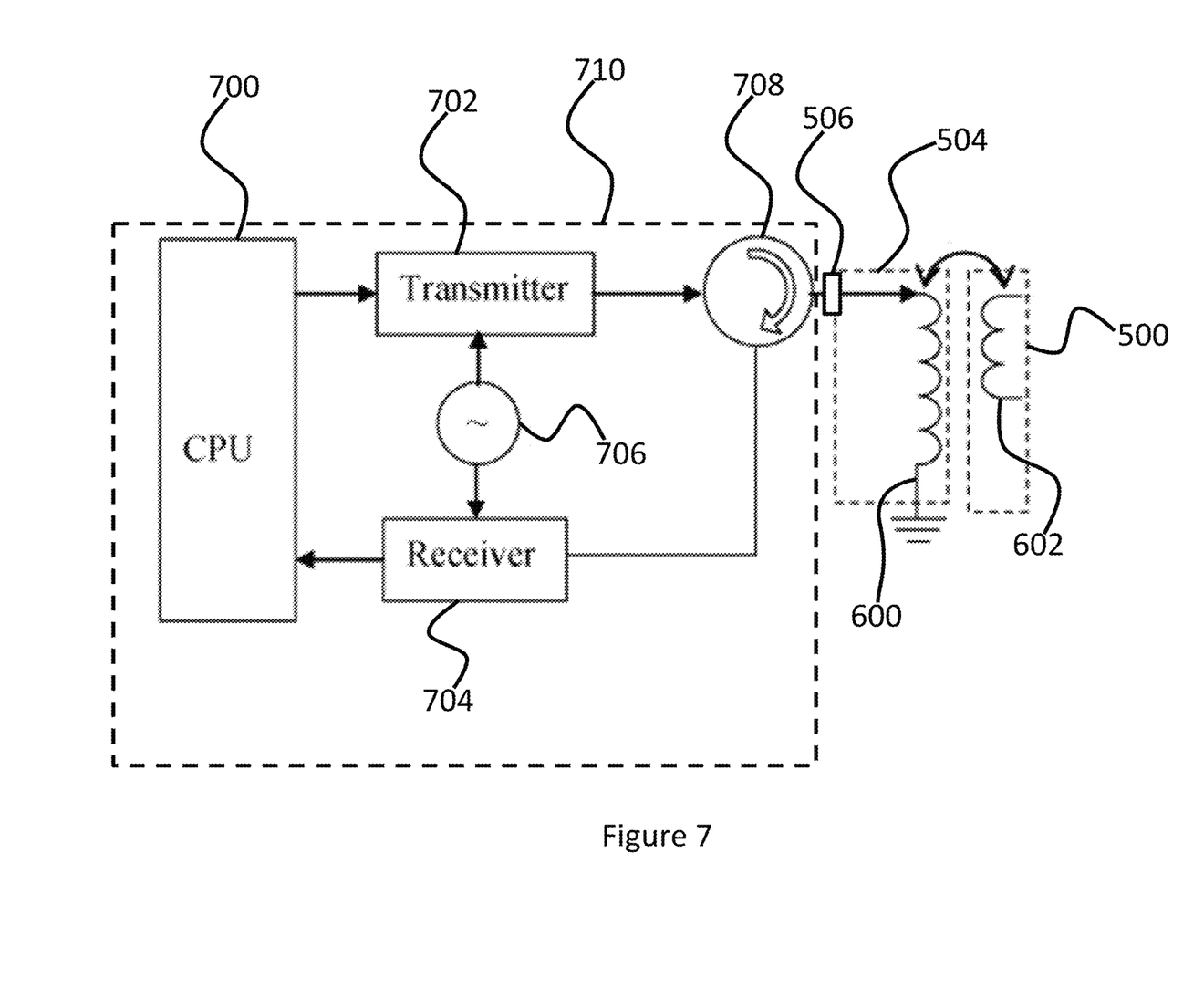
FIG. 7 is a schematic showing a wired, external probe in wired communication with a die through a communications port, the die being in further, wireless communication with a dielet.

FIG. 7 provides a schematic showing a wired, external probe in wired communication with a die through a communications port, the die being in further, wireless communication with a dielet, in accordance with embodiments of the present disclosure. In such embodiments, a wired, external probe 710 is connected to the communications port 506 of the die using a wired connection, thereby placing it in operative communication with the interrogator 600, which is fixed in position on the die 504 for optimal communication with the dielet 500 antenna 602.

In embodiments, the wired, external probe 710 comprises a processor 700 in operative communication with a transmitter 702 and receiver 704, both of which are in operative communication with an oscillator 706 and a circulator 708 configured to allow the wired, external probe 710 to communicate with the dielet 500 over a single wire connection by conveying signals from the transmitter 702 to the communications port 506 while directing signals emanating from the communications port 506 to the receiver 704.

In embodiments, the oscillator is configured to oscillate at approximately 24 GHz.

In embodiments, the dielet 500 is 100 μm×100 μm×10 μm.

In embodiments, the die 504 is 200 μm thick.

In embodiments, the dielet 500 comprises an RF interface configured to work in the near field. In embodiments, the RF interface is an RFID (radio frequency identification) interface.

In embodiments, the dielet 500 comprises a unique identifier. In embodiments, the unique identifier is a one-time write memory while, in other embodiments, it is a Physically Unclonable Function (PUF).

In embodiments, the dielet 500 further comprises sensors capable of capturing attempts to image, de-solder, de-lid, and/or image the die 504. In embodiments, these sensors are passive, unpowered sensors.

In embodiments, mechanical processes are used to make the dielet 500 fragile and prevent its intact removal from the die 504.

Finally, in embodiments the dielet 500 utilizes a full encryption engine to protect communications between itself and the die 504.

As embodiments of the dielets 500 described herein do not impose any design constraints on the die 504, they could be integrated into almost any die 504 package without significant difficulty, allowing a widespread adoption of the technology to occur rapidly and without significant expense relating to die 504 redesign to accommodate the dielet 500.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A system, comprising:
a die comprising an interrogator configured for wireless, near field communications and an externally-accessible communications port in electrical communication with said interrogator; and
a dielet permanently affixed to a surface of the die, the dielet comprising an antenna configured for wireless, near field communication with the interrogator,
wherein the dielet is attached to the die such that the interrogator and antenna are permanently aligned with one another during the manufacturing process;
wherein the dielet is configured to power on and respond with a unique identifier that allows a user to verify a provenance of the die in response to a signal from the interrogator; and
wherein the interrogator is placed within the die itself, thereby fixing and reducing the distance between the interrogator and the antenna.

2. The system of claim 1 wherein the antenna and interrogator are loop antennas.

3. The system of claim 1 wherein the dielet is a radio frequency identification tag.

4. The system of claim 1 wherein the dielet further comprises sensors configured to capture attempts to tamper with the die and storage configured to record attempts to tamper with the die.

5. The system of claim 4 wherein the sensors configured to capture attempts to tamper with the die are selected from the group consisting of sensors designed to capture attempts to de-solder, de-lid, and image the die.

6. The system of claim 4 wherein the sensors configured to capture attempts to tamper with the die are passive.

7. The system of claim 4 wherein the sensors configured to capture attempts to tamper with the die are unpowered.

8. The system of claim 7 wherein the sensors configured to capture attempts to tamper with the die are powered by electromagnetic emissions from the interrogator.

9. The system of claim 1 wherein dimensions of the dielet are 100 µm×100 µm×10 µm.

10. The system of claim 1 wherein the dielet is powered by electromagnetic emissions from the interrogator.

11. The system of claim 1 wherein the unique identifier is a one-time-write memory.

12. The system of claim 1 wherein the unique identifier is a physically unclonable function.

13. The system of claim 1 wherein said dielet is configured to be fragile, thereby preventing its intact removal from the die.

14. The system of claim 1 further comprising a glass layer disposed between the die and dielet.

15. The system of claim 14 wherein said glass layer is 5 µm thick.

16. The system of claim 1 wherein the dielet utilizes a full encryption engine to protect communications between itself and the interrogator.

17. The system of claim 1 wherein the communications port is a Radio Frequency (RF) interface.

18. A method of authenticating a die comprising an interrogator configured for wireless, near field communications and an externally-accessible communications port in electrical communication with said interrogator, the die further comprising a dielet mounted thereon, the dielet comprising an antenna configured for wireless, near field communication with the interrogator, the method comprising:
connecting a probe configured for wired connection to the externally-accessible communications port;
using the probe, emitting a Radio Frequency (RF) signal through the communications port, thereby powering the dielet; and
using the probe, receiving a signal from the dielet,
wherein the dielet is attached to the die such that the interrogator and antenna are permanently aligned with one another during the manufacturing process,
wherein the signal from the dielet comprises a physically unclonable function that allows a user to verify a provenance of the die, and
wherein the interrogator is placed within the die itself, thereby fixing and reducing the distance between the interrogator and the antenna.

19. A kit, the kit comprising:
a die comprising an interrogator configured for wireless, near field communications and an externally-accessible communications port in electrical communication with said interrogator;
a dielet comprising an antenna configured for wireless, near field communication with the interrogator; and
a probe configured for wired connection to the externally-accessible communications port,
wherein the dielet is attached to the die such that the interrogator and antenna are permanently aligned with one another,
wherein the dielet is configured to power on and respond with a unique identifier that allows a user to verify a provenance of the die in response to a signal from the interrogator,
wherein the probe is configured to utilize the interrogator to communicate with the dielet through the dielet's antenna;
wherein the interrogator is placed within the die itself, thereby fixing and reducing the distance between the interrogator and the antenna.

* * * * *